Jan. 9, 1968   R. C. SABINS   3,362,900
SYSTEM FOR CATHODICALLY PROTECTING A STRUCTURE
Filed Oct. 17, 1962
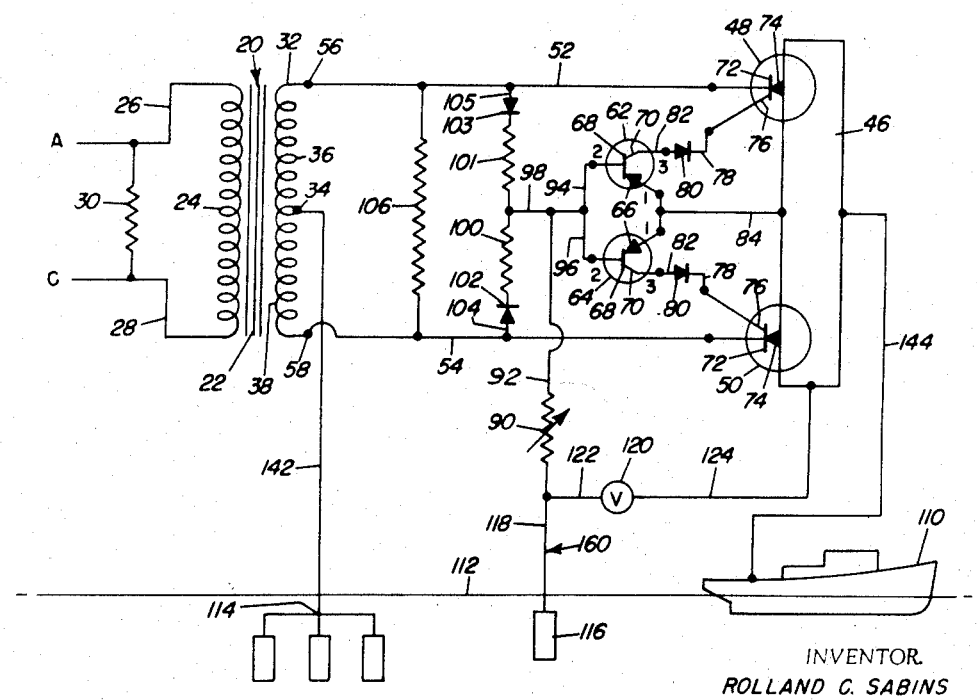
INVENTOR.
ROLLAND C. SABINS
BY
ATTORNEY

United States Patent Office 3,362,900
Patented Jan. 9, 1968

3,362,900
SYSTEM FOR CATHODICALLY PROTECTING
A STRUCTURE
Rolland C. Sabins, San Diego, Calif., assignor to
Hull Protectors, Inc., San Diego, Calif., a corporation of California
Filed Oct. 17, 1962, Ser. No. 231,090
13 Claims. (Cl. 204—196)

The present invention relates to a system for cathodically protecting a structure which is immersed in an electrolyte, which system employs an electric current generating system for supplying direct current to the structure in which the main current source is of the alternating current type.

The electrical current generating system of the present invention comprises a secondary winding of an alternating current transformer. This secondary winding, in conjunction with other instrumentalities, provides one or more sources of direct current, each increasing from zero to maximum voltage. These instrumentalities comprise a self-firing controlled rectifier, preferably of the solid state, having a gate junction, and a current responsive device for controlling the controlled rectifier. Although a single source of direct current can be generated by the secondary winding, in conjunction with the self-firing controlled rectifier and current responsive device, I prefer a system in which the secondary winding is provided with an intermediate junction, commonly known as a center tapped secondary coil, which divides the winding into two coils. In this preferred embodiment, two power circuits are provided, each having its individual controlled rectifier connected in series circuit relation and each of the coils is controlled individually by a current responsive device.

A monitoring circuit is also provided which, through current responsive devices, controls the firing of the self-firing controlled rectifiers, such firing being controlled through the respective gates of these rectifiers.

In the embodiment illustrated, the current consuming device is in the monitoring circuit, which monitoring circuit can then function, or cause to be energized in accordance with the demands of the current consuming element. When desired, this monitoring circuit can be energized by a source of current, other than the source created by the two aforementioned coils.

The monitoring circuit of the present invention, as herein illustrated, includes two transistors which are connected in parallel circuit relation. The collector of one of these transistors is connected in circuit relationship to the gate of one of the controlled rectifiers, and the collector of the other transistor is connected with the gate circuit of the other controlled rectifier.

The present invention is particularly useful in a system for cathodically protecting a structure, which is emerged in an electrolyte, against corrosion. Such corrosion prevention system employs an anode which is connected to the secondary winding and is herein shown as connected to the center tap junction of the secondary winding, i.e., at the junction of the two coils, and the opposite ends of the two coils are connected to the structure which is emerged in the electrolyte through the controlled rectifiers.

In this corrosion prevention system, the monitoring circuit includes a reference anode which is emerged in the electrolyte and is coupled with the aformentioned transistors. Variation in potential between the structure to be protected and the reference anode, effects the transistors, which in turn, through the gate junction of the controlled rectifiers, cause the firing of the controlled rectifiers which firing causes current to be impressed upon the structure, cyclically, alternately from the coils through the controlled rectifiers.

Other features and the advantages of the present invention will be apparent from the following description, reference being had to the accompanying drawing wherein preferred embodiments of the invention are illustrated.

In the drawing:

FIG. 1 is a diagrammatic view showing the system applied for cathodic protection to prevent corrosion.

Referring more in detail to the drawing, an isolated rectifier transformer is shown at 20, including a core 22, a primary winding 24, which is connected to the source of alternating current by wires 26 and 28. A non-inductive resistor 30 is connected in parallel circuit relation with primary winding 24. As an example, this resistance is in the order of 1,000 ohms and 100 watts. The resistor 30 is employed to shunt the primary winding 24 to limit surging of current to prevent harmful potential increases in the power line or equipment circuit as a result of switching or any other cause of current collapse. The transformer 20 also includes a secondary winding 32, having a junction 34 midway thereof to divide the same into two power coils 36 and 38.

The system is employed for cathodically protecting a structure against corrosion. Here the structure is shown as the hull 110 of a ship, which is emerged in, for example, sea water, the level of which is indicated at 112, and which sea water functions as an electrolyte. An anode array 114 is also disposed in the sea water and, in actual practice, is carried by the hull. A heat sink 46 is connected by wire 144 to the hull. The center junction 34 of the secondary winding 32 is connected by a wire 142 with the anode array 114. Thus the circuits between the coils 36 and 38, through the hull 110, and anode array 114, is completed through the electrolyte. By proper control, the desired polarization level can be maintained on the metal parts of the ship by impressing current thereto through the coils 36 and 38 in conjunction with the anode 114.

Two self-firing controlled rectifiers 48 and 50 are connected in intimate heat exchange relationship with the heat sink 46. These controlled rectifiers are connected, respectively, with the opposite ends of the winding 32 by wires 52 and 54. These opposite ends are indicated at junction 56 and 58, respectively. The junction 34 of the winding 32, forms a positive terminal for both coils 36 and 38, and consequently, the terminals 56 and 58 are the negative terminals of coils 36 and 38, respectively, when the coils are energized.

The flow of current from the coils 36 and 38, to the hull 110, is controlled by a monitoring circuit 160, having two current responsive devices 62 and 64, which are connected in parallel circuit relationship. These current responsive devices may be any form of diode, but are herein shown as transistors. Each of these transistors includes an emitter 66, a base 68, and a collector 70.

Each of the controlled rectifiers 48 and 50 is provided with a cathode 72, an anode 74, and a gate 76. The cathode is connected with the wire 52; the anode is connected with the heat sink 46; and the gate 76 is connected by wires 78, rectifier 80, and wire 82, with the collector 70 of one of the transistors. The emitters 66 are connected by a wire 84 with the hull 110 through the heat sink 46.

The monitoring circuit for this cathodic protection system is indicated generally at 160, and includes a reference anode 116, which is connected by wire 118 to the wire 92. This monitoring circuit comprehends the wire 118, variable resistance 90, wires 92, 94 and 96, transistors 62 and 64, emitters 66, the wire 84, heat sink 46, wire 144, the hull 110, and the electrolyte. Thus the reference anode 116, the monitoring circuit, the hull 110 and the electrolyte, form an electrolytic cell for controlling the electrolytic cell formed by the anode 114, the electrolyte and the hull 110.

A slight variation in potential difference between the reference electrode 116 and the hull 110, causes the triggering of the transistors 62 and 64, which in turn causes the triggering of the self-firing controlled rectifiers 48 and 50, whereby current is impressed alternately and cyclically by the coils 36 and 38 onto the hull 110. In this manner, the polarization level of the hull is maintained constant.

This permits a conductor path through the transistor from the collector 70 to the base 68, to conduct the necessary firing currents from the respective self-firing controlled rectifier, when a predetermined potential difference exists between the hull 110 and the reference anode 116. When the electron flow is traveling from junction 34, between the coils 36 and 38, through coil 36, terminal 56 and wire 52, firing current is delivered into the controlled rectifier 48, which continues through the gate 76, wire 78, rectifier 80, wire 82, collector 70, base 68, wires 94, 92 and 98, resistor 100, rectifier 102 and wires 104 and 54, to the junction 58, which is connected to the power coil 38, the electrons continuing to flow through coil 38 to the junction 34. It will be understood that when load coil 38 is energized, controlled rectifier 50 will be brought into play through the transistor 64, the firing circuit being completed through resistor 101, rectifier 103 and wires 105 and 52, to the terminal 56 of coil 36.

It will be understood that the coils 36 and 38 are alternately and cyclically rendered effective, the potential building up from zero to maximum voltage alternately and cyclically as the current reverses in the primary 24 of the transformer, due to current being induced into the coils 36 and 38. Since the controlled rectifiers 48 and 50 are controlled by the transistors 62 and 64, which are connected in parallel circuit relationship with one another, and in series relationship with the controlled rectifiers, i.e, transistor 62 with controlled rectifier 48 and transistor 64 with controlled rectifier 50, a subtsantially constant flow of current takes place from the winding 32 to the hull 110.

The inherent characteristics of these self-firing controlled rectifiers, are such that their holding currents fall to zero at the completion of each half cycle.

Signal current which provides the initial functional control, does not serve to buck out the holding current of the controlled rectifier's gate circuit. The small value of current required in the monitoring circuit is used only to trigger the transistors to forward condition, and serves as a switching means of the gate circuits of both controlled rectifiers. These power rectifiers, when connected with their respective gate terminals, through the respective controlled secondary coils 36 and 38, are self-firing on each half cycle, respectively.

A non-inductive resistor is connected to wires 52 and 54, and is for the purpose of limiting the potential surge peaks to exceptionally low value to protect the gate circuit junction of the controlled rectifiers, and also to protect the switching transistor junctions from over voltage peaks.

The value of current required in the monitoring circuit to some degree on the rate of capacity of the controlled rectifiers being employed, since this determines the milliwatt rating of transistor used for switching the gate current. As an example, in the cathodic protecting system, the controller has a rated output of ten amperes of full wave direct current. In this case, the reference electrode 116 would be required to deliver approximately 1.25 milliamperes at a potential of approximately ten millivolts to switch open the PNP transistors 62 and 64 to a conducting state in their respective forward directions. The variable resistance 90 is employed for determining the value of the current flow from the reference electrode 116. As the voltage increases, by reason of the flow of electrons from the coils 36 and 38, a back electromotive force develops as the ship's polarization reaches the predetermined polarization setting whch is made by the adjustment of the resistance 90. When the polarization of the ship equals the polarization of the reference electrode, the transistor gates close and cease to conduct in the forward direction, thus closing the gate circuits of the controlled rectifiers, thus blocking the load currents at the junctions of the controlled rectifiers. As the polarization begins to drop, a mere ten millivolt maximum, with respect to the potential difference between the ship and the reference electrode, the transistors 62 and 64 again are brought into play to cause the firing of the controlled rectifiers.

While not limited thereto, the transistors herein employed, may be of the PNP germanium type, and the controlled rectifiers are preferably of the silicon type, and referred to as SCR.

One of the advantages of the present invention lies in the fact that a voltmeter 120 can be connected by wires 122 and 124, so as to obtain a direct reading of the polarization level of the ship's hull 110, using the magnesium reference electrode 116 as a reference electrode. The voltmeter can be specially calibrated, and by adjusting the external resistance within the voltmeter, it will designate the true polarization level of the ship. Thus this reference electrode, not only functions as an anode in the monitoring circuit, but also functions as a reference electrode, indicating the polarization level of the ship.

This reference electrode is preferably formed of a magnesium alloy. This magnesium alloy remains extremely stable with respect to its surface potential in sea water, provided there is sufficient surface relative to the current demand that will be placed thereon. It has been observed that under the light current load conditions, necessary in the monitoring circuit, that this alloy of magnesium reference electrode will remain at approximately 1,490 millivolts with reference to a silver-silver chloride electrode, and is not subject to surface potential changes due to calcareous deposits, or other deposits which would cause other metals, such as zinc, to travel toward the passive state. In addition, this magnesium alloy reference electrode 116 can be used for supplying the necessary current to drive a medium-sensitive voltmeter 120. The normal demands of the monitoring circuit and the voltmeter circuit, represents only a few milliamps of current.

The anode 114 may be of the inert type, such as platinum or lead-platinum, or carbon, or any other suitable anode material, or, may be of the sacrificial type, such as a magnesium alloy or zinc alloy.

Inasmuch as the monitoring system and the controlled rectifier are extremely sensitive to slightest changes in potential between the reference electrode 116 and the cathode of ship's hull 110, the flow of electrons from the anode array 114, can be minutely controlled to such extent that a magnesium alloy, can be employed. The use of magnesium alloy, which is higher in the electrochemical series than the steel hull, instead of, for example, zinc, has several advantages, in that far less magnesium anode surface than zinc, need be employed, reducing materially the labor cost of installation, initially and for renewals; this magnesium alloy is not subject to surface potential changes due to calcareous deposits, or other deposits, which would cause other metals, such as zinc, to travel toward the passive state.

Another advantage of the present invention resides in the fact that except for the voltmeter, which is not necessary for the control of the system, the entire system is of solid state material. The control function is achieved entirely through the proportional functions inherent in the transistor junction as related to the proportional requirements of the gate firing circuit, which in turn precisely controls the blocking of emission of the load currents through the rectifiers; thus, all mechanical moving parts are eliminated. In fact, the variable resistance can be permanently set so as to avoid all contacts, it being required only when a variable voltage output is required.

It will be observed that the system provides inherent proportional control so that the unit can also be designed to limit any currents at the output. Thus, the ratings cannot be exceeded, either intentionally or accidentally. The unit delivers in accordance with the precise current demands of the hull, irrespective of whether transient variable occurs in the load circuit, or whether it occurs on the alternating current input power line. The proportional control circuit is responsive to variables, both upstream and downstream, with respect to input supply and output demand.

While the forms of embodiment herein shown and described, constitute preferred forms, it is to be understood that other forms may be adopted falling within the scope of the claims that follow.

I claim:

1. A control system for cathodically protecting a structure immersed in an electrolyte, said system comprising:
   (A) an anode immersed in the electrolyte;
   (B) means providing a source of direct current alternately increasing from zero to maximum voltage;
   (C) a self-firing controlled rectifier having:
      (1) a gate;
   (D) a current supply circuit for impressing a current on the structure, said circuit including the anode, said structure, said electrolyte and said source of direct current, and said self-firing controlled rectifier;
   (E) a reference anode immersed in the electrolyte;
   (F) a single circuit for completely controlling the impressed current by triggering the self-firing controlled rectifier; said last mentioned circuit including said structure, the reference anode, the electrolyte, and further including:
      (1) means connected with the gate of the self-firing controlled rectifier and responsive to variation in potential between the reference anode and said structure for triggering said rectifier.

2. A control system as defined in claim 1, characterized in that the self-firing controlled rectifier includes:
   (C)(2) a cathode;
   (3) and an anode;
and further characterized in that the current supply circuit (D) includes:
   (D)(1) a conductor connecting one side of the source of direct current with the first mentioned anode;
   (2) a conductor connecting the other side of the source of current with the cathode of the rectifier;
   (3) and a conductor connecting the anode of the rectifier with said structure.

3. A control system as defined in claim 1, characterized to include:
   (G) a second means providing a source of direct current alternately increasing from zero to maximum voltage;
   (H) a second self-firing controlled rectifier having:
      (1) a gate;
   (I) a second current supply circuit including the anode, said structure, said electrolyte and said second source of direct current;
   (J) a second means connected with the gate of the second mentioned self-firing controlled rectifier responsive to said variation in potential between the reference anode and the structure for triggering the second mentioned rectifier;
   (K) a primary winding connected with a source of alternating current, said first and second mentioned means provide the sources of direct current forming the opposite end sections of a secondary winding, said primary and secondary windings providing a transformer, the intermediate point of said secondary winding being connected with the first mentioned anode.

4. A control system as defined in claim 3, characterized in that the means which are responsive to said variation in potential between the reference anode and the structure are transistors, each transistor having a collector, the last mentioned circuit (F) including a conductor connecting one of the collectors with one of the gates of the controlled rectifier, said last mentioned circuit (F) also including a conductor connecting the other collector with the gate of the other controlled rectifier.

5. A control system as defined in claim 4 characterized in that each of said self-firing controller rectifiers (C) and (H) includes:
   (2) a cathode;
   (4) and an anode;
and further characterized in that the current supply circuits (D) and (I) include:
   (1) a conductor connecting the positive sides of the sources of direct current with the first mentioned anode;
   (2) a conductor connecting the negative side of one of the sources of direct current with the cathode of one of the self-firing controlled rectifiers;
   (3) a conductor connecting the negative side of the other source of direct current with the cathode of the other self-firing controlled rectifier;
   (4) and conductors connecting the anodes of the self-firing controlled rectifiers with said structure.

6. A control system as defined in claim 3, characterized in that each of said self-firing controlled rectifiers (C) and (H) includes:
   (2) a cathode;
   (3) and an anode;
and further characterized in that the current supply circuits (D) and (I) include:
   (1) a conductor connecting the positive sides of the sources of direct current with the first mentioned anode;
   (2) a conductor connecting the negative side of one of the sources of direct current with the cathode of one of the self-firing controlled rectifiers;
   (3) a conductor connecting the negative side of the other source of direct current with the cathode of the other self-firing controlled rectifier;
   (4) and conductors connecting the anodes of the self-firing controlled rectifiers with said structure.

7. A control system as defined in claim 3, characterized in that means (B) and means (G) are secondary coils of an alternating current transformer characterized to include:
   (L) a meter connected between the reference anode and the structure, said meter being energized by the reference anode;
   (M) a conductor connecting the gate of one of said controlled rectifiers with the collector of one of the transistors,
   (N) a rectifier in said conductor for preventing the flow of current from the collector of said one transistor to the gate of said one controlled rectifier,
   (O) a second conductor connecting the gate of the other of said controlled rectifiers with the collector of the other of said transistors,
   (P) a rectifier in said last mentioned conductor for preventing the flow of current in said last mentioned conductor from the collector of said other transistor to the gate of said other controlled rectifier.
   (Q) a conductor connecting the emitter of one of said transistors to said structure,
   (R) a conductor connecting the emitter of the other of said transistors to said structure,
   (S) a conductor connecting the base of one of said transistors with the negative side of one of said coils, and connecting the base of the other of said transistors with the negative side of the other of said coils, (T) a rectifier in the last mentioned conductor for preventing the flow of current from said negative side of the coil to the last mentioned base,
(U) a conductor connecting the base of the other of said transistors with the negative side of the other of said coils,
(V) a rectifier in said last mentioned conductor for preventing the flow of current from the negative side of said last mentioned coil to said last mentioned base,
(W) and a conductor connecting the reference anode to the bases of said transistors.

8. A control system as defined in claim 1, characterized in that the means (F)(1) for triggering the self-firing controlled rectifier is a transistor having a collector, said last mentioned circuit (F) including a conductor connecting the collector of the transistor with the gate of the controlled rectifier.

9. A control system as defined in claim 8, characterized in that the self-firing controlled rectifier includes:
(C) (2) a cathode;
(3) and an anode;
and further characterized in that the current supply circuit (D) includes:
(D)(1) a conductor connecting one side of the source of direct current with the first mentioned anode;
(2) a conductor connecting the other side of the source of current with the cathode of the rectifier;
(3) and a conductor connecting the anode of the rectifier with said structure.

10. A control system as defined in claim 1, characterized in that said means (F)(1) for triggering the self-firing controlled rectifier is a transistor having a base, a collector and an emitter, and further characterized to include:
(G) a meter connected between the reference anode and the structure, said meter being energized by said reference anode;
(H) a conductor connecting the gate of said controlled rectifier with the collector;
(I) a rectifier in said conductor for preventing the flow of current from the collector of said transistor to the gate of said controlled rectifier;
(J) a conductor connecting the emitter of said transistor to said structure;
(K) a conductor connecting the base of said transistor with the negative size of said source of direct current;
(L) and a conductor connecting the reference anode to the base of said transistor.

11. A control as defined in claim 1, characterized in that the first mentioned anode is formed of inert material.

12. A control system as defined in claim 1, characterized in that the first mentioned anode is formed of a sacrificial material.

13. A control system as defined in claim 1, characterized in that the first mentioned anode is formed of a magnesium alloy which is higher in the electrochemical series than the said structure.

References Cited

UNITED STATES PATENTS

| | | | |
|---|---|---|---|
| 669,922 | 3/1901 | Gottlob | 204—196 |
| 2,221,997 | 11/1940 | Polin | 204—196 |
| 2,912,635 | 11/1959 | Moore | 307—88.5 |
| 2,918,420 | 12/1959 | Sabins | 204—196 |
| 2,963,413 | 12/1960 | Sabins | 204—196 |
| 2,977,523 | 3/1961 | Cockrell | 323—22 |
| 3,033,996 | 5/1962 | Atherton | 328—146 |
| 3,095,534 | 6/1963 | Cockrell | 321—46 |
| 3,108,055 | 10/1963 | Grant | 204—196 |
| 3,141,124 | 7/1964 | Atherton | 323—22 |
| 3,241,044 | 3/1966 | Mills | 323—22 |
| 3,242,064 | 3/1966 | Byrne | 204—147 |
| 3,244,962 | 4/1966 | Genuit | 323—22 |
| 3,269,933 | 8/1966 | Mahoney et al. | 323—22 |

FOREIGN PATENTS 221,673    6/1962    Australia.

OTHER REFERENCES

"Basic Electrical Engineering," 2d. ed., 1957, pp. 412–417.

HOWARD S. WILLIAMS, *Primary Examiner.*

MURRAY TILLMAN, *Examiner.*

T. H. TUNG, *Assistant Examiner.*

UNITED STATES PATENT OFFICE
CERTIFICATE OF CORRECTION

Patent No. 3,362,900                      January 9, 1968

Rolland C. Sabins

It is hereby certified that error appears in the above numbered patent requiring correction and that the said Letters Patent should read as corrected below.

Column 2, line 15, after "with" insert -- the --; column 3, line 51, for "condition" read -- conduction --; line 62, after "circuit" insert -- depends --; column 4, line 3, for "whch" read -- which --; column 6, line 14, for "(4)" read -- (3) --; column 8, line 4, for "size" read -- side --; line 8, after "control" insert -- system --.

Signed and sealed this 25th day of February 1969.

(SEAL)
Attest:

Edward M. Fletcher, Jr.                      EDWARD J. BRENNER
Attesting Officer                             Commissioner of Patents